Figure 1:
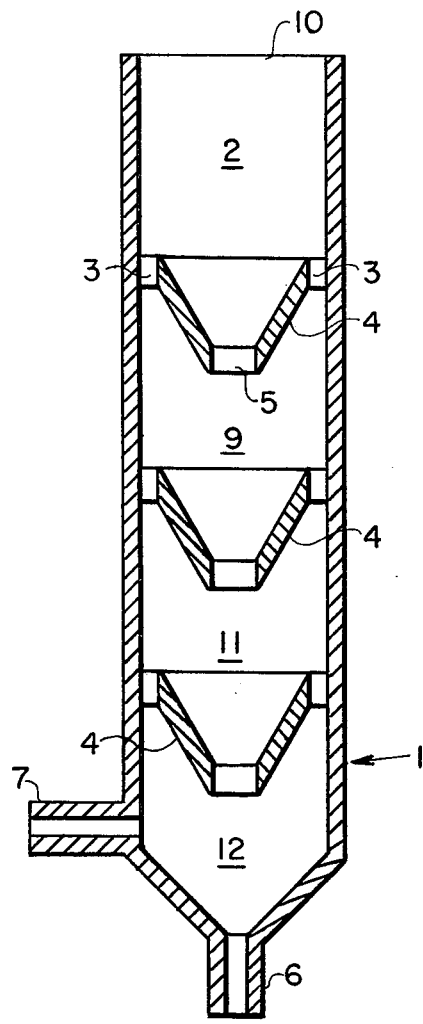

United States Patent [19]
Fuller

[11] 3,975,505
[45] Aug. 17, 1976

[54] PRODUCTION OF CHLORINE DIOXIDE

[75] Inventor: Willard A. Fuller, Grand Island, N.Y.

[73] Assignee: Hooker Chemicals & Plastics Corporation, Niagara Falls, N.Y.

[22] Filed: Dec. 13, 1974

[21] Appl. No.: 532,666

[52] U.S. Cl. .............................. 423/478; 423/500; 423/505; 423/552
[51] Int. Cl.² ..................... C01B 11/02; C01B 7/02; C01D 5/02
[58] Field of Search ........... 423/478, 551, 552, 500, 423/505

[56] References Cited
UNITED STATES PATENTS

| | | |
|---|---|---|
| 3,563,702 | 2/1971 | De Vere Partridge et al. .... 423/478 |
| 3,733,395 | 5/1973 | Fuller ................................. 423/478 |
| 3,754,081 | 8/1973 | De Vere Partridge et al. 423/478 X |
| 3,760,065 | 9/1973 | Rapson .............................. 423/478 |
| 3,793,439 | 2/1974 | Rapson .............................. 423/478 |

OTHER PUBLICATIONS

J. W. Mellor's "A Comp. Treatise on Inorganic and Theoretical Chem.," vol. 2, 1922 Ed., p. 685; Longmans, Green & Co., New York.

Primary Examiner—Edward Stern
Attorney, Agent, or Firm—Peter F. Casella; William J. Crossetta, Jr.

[57] ABSTRACT

There is provided an improved process for the production of chlorine dioxide wherein an alkali metal chlorate, and a mineral acid are reacted in a single vessel, and the salt crystals separated from the generator crystal slurry.

9 Claims, 2 Drawing Figures

PRODUCTION OF CHLORINE DIOXIDE

This invention relates to chlorine dioxide and chlorine production. More particularly, this invention relates to improvements in a method for treating sulfur-containing effluent emanating from chlorine dioxide generators.

Inasmuch as chlorine dioxide is of considerable commercial importance in the areas of pulp bleaching, water purification, fat bleaching, removal of phenols from industrial wastes, textile bleaching, and the like, it is very desirable to provide processes by which chlorine dioxide can be economically generated.

One of the means for generating chlorine dioxide is by the reaction of alkali metal chlorate, alkali metal chloride and a mineral acid. Preferably, in such processes, the alkali metal chlorate employed is sodium chlorate, the alkali metal chloride is sodium chloride, and the mineral acid is sulfuric acid or a mixture of sulfuric acid with other mineral acids such as phosphoric acid or hydrochloric acid. Such reactions as occur are emplified by the following:

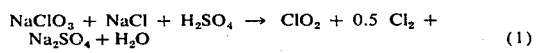

$NaClO_3 + NaCl + H_2SO_4 \rightarrow ClO_2 + 0.5\ Cl_2 +$
$Na_2SO_4 + H_2O$ (1)

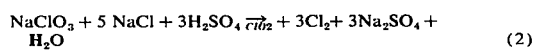

$NaClO_3 + 5\ NaCl + 3H_2SO_4 \rightarrow ClO_2 + 3Cl_2 + 3Na_2SO_4 + H_2O$ (2)

Such reactions are employed commercially, with the reactants continuously fed into a reaction vessel and the chlorine dioxide and chlorine produced therein continously removed from the reaction vessel.

Reaction (1), which is favored inasmuch as it produces primarily chlorine dioxide, results from the use of about equimolar amounts of chlorate and chloride.

A single vessel process for producing chlorine dioxide is set forth in U.S. Pat. No. 3,563,702, wherein alkali metal chlorate, an alkali metal chloride and a mineral acid solution are continuously fed to a single vessel generator-evaporator-crystallizer in proportions sufficient to generate chlorine dioxide, at a temperature of from about 65° to about 85°C and an acidity in the generator of from about 2 to about 4 normal, removing water from the reaction system by vacuum-induced evaporation, conducted under a vacuum of from about 100 to about 400 millimeters of mercury absolute to effect evaporation of water vapor, with concurrent withdrawal of chlorine dioxide, crystallizing the neutral alkali metal salt of the mineral acid within the generator-evaporator-crystallizer and withdrawing the crystals as a slurry from the generator.

In those reaction systems wherein the acid normality is maintained between about 2 and 4, the reaction is conducted in the presence of a relatively small amount of a catalyst selected from the group consisting of vanadium pentoxide, silver ions, manganese ions, dichromate ions and arsenic ions.

As the reaction producing the chlorine dioxide occurs within the generator, in reactions where sulfuric acid is utilized as the mineral acid reactant, crystals of sodium sulfate, acid sodium sulfate and/or sodium sulfate hydrates, in amounts and presence dependent generally upon the acid concentration used, are crystallized out and settle to the bottom of the generator from whence they are withdrawn in the form of a slurry.

Generally, past techniques for processing the withdrawn slurry have involved such as contrifugal separation, filtration and other standard separation techniques. Mother liquors and water waters, where employed in such separatory procedures, may or may not be returned to the generator.

However, such crystal slurry treatment processes have not been totally satisfactory in the single vessel process (SVP) due to maintainance problems, the requirements for additional steam sources to operate the filter and more importantly, filtration does not operate to return at 100 percent efficiency to the reactor chlorate and chloride values present in the withdrawn crystal slurry.

The single vessel process can also be conducted at high acid normalities, with the acid normality in the generator maintained at levels between about 4 and about 11 normal. Certain advantages accrue in maintaining the reaction at such high acid levels. The concentration of the more expensive chlorate is reduced by a factor up to about 10 over the requirements of the low acid concentration process. The lower chlorate concentration allows for quick and economical startup, stopping, and rate adjustment of the system. Also, importantly, the requirement for the presence of a catalyst is obviated, and losses due to entrainment, spillage and the like are minimized.

Generally, when the acid concentration in the generator is maintained on the low side, i.e., from about 2 to about 4 normality, the slurry contains chlorate, chloride values, sulfuric acid and crystalline sodium sulfate.

Generally, when the acid concentration in the generator is maintained on the high side, i.e., from about 4 to about 11 normality, e.g. about 10 the slurry contains chlorate and chloride values, sulfuric acid and acid sodium sulfate.

It is an object of the present invention to provide an improved process for the treatment of the crystal slurry produced in single vessel chlorine dioxide production, efficiently separate the crystalline constituents therefrom and to substantially return all of the chlorate, chloride and sulfuric acid values to the generator for further reaction.

In accordance with the present invention, single vessel process slurry is introduced into the top of a separatory column, water at a temperature of from about 30° to about 70°C is added continuously via an inlet located near the bottom of the separatory column in countercurrent flow to the downward flow of the slurry, with the crystals contained in the downward flowing slurry continuously washed by the water, and the crystals removed as aqueous slurry via an outlet located near the bottom of the separatory column.

By the present process, the efficiency of the chlorine dioxide generating system is increased essentially all of the chloride, chlorate values and mineral acid being returned in a continuous washing to the generator and less energy is required in operating the system. Additionally, in those systems wherein the generator is operated under high acid concentrations, the sodium sulfate is recovered as neutral sodium sulfate, as opposed to the undesirable acid sodium sulfates recovered by slurry filtration techniques.

The size of the separatory column may be on the order of 6–24 feet in diameter and 10–15 feet or longer, dependent primarily on the size of the generator employed.

The rates of flow of slurry and water are adjusted so as to provide a maximum washing efficiency without substantially increasing the steam requirements for the vacuum evaporation in the generator, generally about 0.4 to about 4 pounds of water per each pound of sodium sulfate produced continuing into the generator and the remaining water sufficient to continuously remove the sodium sulfate as a flowable slurry from the separatory column. The slurry of crystalline sodium sulfate is removed and utilized, e.g. by pumping to a mill digestor liquor system or dissolved in kraft mill black liquor.

Figure 2:
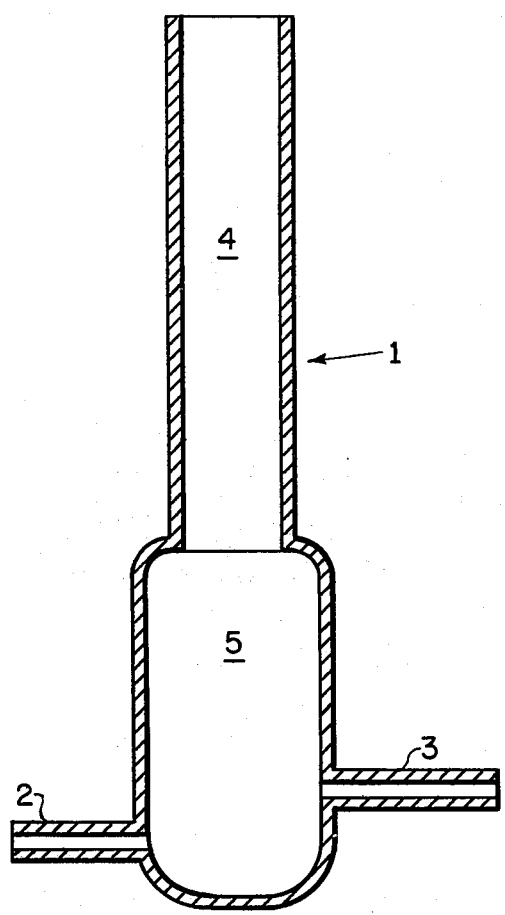

FIGS. 1 and 2 are illustrative of the separatory columns which are advantageously employed in the process of the present invention. FIGS. 1 and 2 are schematic vertical elevations.

Referring now to FIG. 1, the apparatus embodies a separatory column or tower 1, made of a corrosion-resistant material such as titanium, plastics or ceramic. The column is preferably, although not necessarily, substantially cylindrical, having an inlet means 10 at its upper end for the introduction of crystal slurry from the single vessel reactor (not shown). The lower end of the column is provided with a hot water inlet 7 and a washed-crystal takeoff means 6. The column 1 is divided into multiple washing zones 9, 11, etc. by downwardly tapering funnel-shaped ledges 4 having openings 5 at the apex for discharging crystal slurry downward into a turbulent washing zone 9 and 11, the flow of crystal-containing slurry directed downward from ledge to ledge, and succeeding turbulent wash zones.

Each funnel-shaped ledge is provided with multiple apertures 3 located at or near the junction of the uppermost portion of the ledge and the column wall. As the crystal-containing slurry moves downward onto the ledge and through the opening 5. The upcoming flow of hot wash water is diverted in part through opening 3, setting up a circulatory flow around and in the funnel-shaped ledges, creating turbulence in the zones immediately below the ledge openings, and continuously freeing the sulfate crystals from chlorate, chloride and sulfuric acid values which are continuously returned to the generator. Control of the downward flow of the crystals and the extent of turbulence is conveniently effected by adjusting the relative sizes of the crystal outlet openings 5 and the openings 3.

Zone 8 of the apparatus is a relatively non-turbulent zone whereas the crystals settle by gravity and are not carried by the rising liquid to the washing zone above.

The separatory column may be located immediately below the single vessel generator in which instance, the crystal slurry moves by gravity flow from the generator 10 into the separatory column, and the chlorate, chloride and sulfuric acid values are continuously returned directly to the generator in that portion of the wash water directed by upward flow into the generator.

The total number of ledges situated in the separatory column may be varied, dependent generally upon washing efficiency and quantity of wash water to be used, and upon space considerations. In use, employing commercially available single vessel generators, with a capacity of about 6000 gallons, separatory columns of the type described having from 0.5 to 1 ledge per linear foot of column have been found to be effective separatory columns. Generally, columns of about 10–15 feet in length, having about 8–10 ledges spaced approximately one foot apart are preferred.

In those instances where space and other factors dictate the placement of the separatory column at a site adjacent the single vessel generator, crystal-containing slurry removed from the bottom of the generator is pumped by suitable pumping means (not shown) to the top of the separatory column and the wash water containing chlorate, chloride and sulfuric acid values returned from zone 12 of the separatory column to the generator via suitable outlet and conveying means (not shown).

FIG. 2 represents another separatory column useful in the process of the present invention. The separatory column, as with the separatory column of FIG. 1, may be situated either adjacent to or immediately below the single vessel generator. In those instances where the separatory column is located immediately below the single vessel generator, crystal slurry is continuously moved from the bottom of the generator (not shown) to the top of the column 1 at zone 4. Hot wash water is continuously admitted to the column via 2 and flows upwardly through the column, continuously washing the down flowing crystals, and continuously returning the chlorate, chloride and sulfuric acid values removed therefrom to the generator from the top of the column. The washed crystals move downward into a crystal collection zone 5 from whence they are removed via outlet 3. Outlet 3, shown as located at a point on the column 1 above the hot water inlet 2 may be varied in position near the bottom of the column.

As with the column in FIG. 1, this separatory column can also be situated adjacent the single vessel reactor, in which instance pumping means are provided to continuously feed the crystal slurry from the generator to the separatory column, and the water containing the removed chlorate, chloride and sulfuric acid values continuously removed from the top of the column and returned continuously to the generator via suitable pumping and inlet means.

Utilizing the process of the present invention, it was found that the amount of chlorate, chloride and sulfuric acid values remaining in the recovered sulfate were approximately 0.2 to about 0.25 that remaining in the sulfate when attempting standard separatory techniques with filters. Additionally, utilizing the process of the present invention, where the single vessel generator is operated at high acid normalities, the undesirable acid sulfates produced are converted into neutral sodium sulfate during the washing, not possible when utilizing filter or centrifuge-type separatory procedures.

What is claimed is:

1. In a process for continuously generating a mixture containing chlorine dioxide, chlorine and a neutral alkali metal salt wherein
   a. an alkali metal chlorate, an alkali metal chloride and a strong mineral acid selected from the group consisting of sulfuric acid and mixtures of sulfuric acid and a member of the group consisting of hydrochloric acid and phosphoric acid are continuously reacted in a single vessel generator-evaporator-crystallizer in proportions to generate chlorine dioxide and chlorine;
   b. the temperature is maintained at between about 65° to about 85°C;
   c. the acidity of the reaction solution is maintained within the range of from 2 to 4 normal;
   d. the reaction solution is subjected to a vacuum of from about 100 to about 400 millimeters of mercury absolute to effect evaporation of water vapor;
   e. chlorine dioxide and chlorine produced by said reaction solution is withdrawn in admixture with said water vapor, and the reaction is conducted in the presence of at least one catalyst selected from the group consisting of vanadium pentoxide, silver ions, manganese ions, dichromate ions and arsenic ions; and f. neutral alkali metal salt of said mineral acid is crystallized within said generator-evaporator-crystallizer and withdrawn therefrom in the form of an aqueous slurry containing minor amounts of chlorate, chloride and acid values;

the improvement which comprises:

continuously passing the slurry containing neutral alkali metal salt crystals produced in said generator-evaporator-crystallizer into the top of a separatory column, in a downward flow;

countercurrently passing a stream of hot water continuously upwardly through said column at a rate sufficient to effect washing of the downwardly flowing crystals whereby chlorate, chloride and acid values recovered therefrom are continuously and substantially completely returned to said generator-evaporator-crystallizer; and continuously removing an aqueous slurry of substantially pure neutral alkali metal sulfate salt crystals from the bottom of said separatory column.

2. In a process for continuously generating a mixture containing chlorine dioxide, chlorine and alkali metal salt wherein a. an alkali metal chlorate, an alkali metal chloride and a strong mineral acid selected from the group consisting of sulfuric acid and mixtures of sulfuric acid and a member of the group consisting of hydrochloric acid and phosphoric acid are continuously reacted in a single vessel generator-evaporator-crystallizer in proportions to generate chlorine dioxide and chlorine, and in the absence of a catalyst;

b. the temperature is maintained at between about 65° and about 85°C;

c. the acidity of the reaction solution is maintained within the range of from above 4 to about 11;

d. the reaction solution is subjected to a vacuum of from about 100 to about 400 millimeters of mercury absolute to effect evaporation of water vapor;

e. chlorine dioxide and chlorine produced by said reaction solution is withdrawn in admixture with said water vapor; and f. alkali metal salt of said mineral acid is crystallized within said generator-evaporator-crystalizer and continuously withdrawn therefrom in the form of an aqueous slurry containing minor amounts of chlorate, chloride and acid values;

the improvement which comprises continuously passing the slurry containing alkali metal salt crystals produced in said generator-evaporator-crystallizer into the top of a separatory column, in a downward flow;

countercurrently passing a stream of hot water continuously upwardly through said column at a rate sufficient to effect washing of the downwardly flowing crystals, whereby chlorate, chloride and acid values recovered therefrom are continuously and substantially completely returned to said generator-evaporator-separator, and acid alkali metal salt crystals are converted to neutral alkali metal salt crystals; and continuously removing an aqueous slurry of substantially pure neutral alkali metal sulfate salt crystals from the bottom of said separatory column.

3. The process as defined by claim 1 wherein the mineral acid is sulfuric acid, the alkali-metal chlorate is sodium chlorate and the alkali metal chloride is sodium chloride.

4. The process as defined by claim 1 wherein the temperature of the wash water is maintained at from about 30° to about 70°C.

5. The process as defined by claim 1 wherein the hot wash water is continuously fed into the separatory column at a rate sufficient to provide from about 0.4 to about 4 pounds of water per each pound of alkali metal salt crystals produced in said generator-evaporator-crystallizer.

6. The process as defined by claim 2 wherein the reaction is conducted at an acid normality of about 10.

7. The process as defined by claim 2 wherein the mineral acid is sulfuric acid, the alkali metal chlorate is sodium chlorate and the alkali metal chloride is sodium chloride.

8. The process as defined by claim 2 wherein the temperature of the wash water is maintained at from about 30° to about 70°C.

9. The process as defined by claim 2 wherein the hot wash water is continuously fed into the separatory column at a rate sufficient to provide from about 0.4 to about 4 pounds of water per each pound of alkali metal salt crystals produced in said generator-evaporator-crystallizer.

* * * * *